United States Patent [19]
Jones

[11] Patent Number: 5,398,081
[45] Date of Patent: Mar. 14, 1995

[54] APPARATUS FOR PROJECTING COLORED IMAGES

[75] Inventor: Philip J. Jones, Menlo Park, Calif.

[73] Assignee: Raychem Corporation, Menlo Park, Calif.

[21] Appl. No.: 74,570

[22] Filed: Jun. 7, 1993

[51] Int. Cl.$^6$ .............................................. H04N 9/12
[52] U.S. Cl. ............................. 348/742; 348/758; 348/761; 359/40; 359/237
[58] Field of Search ............................. 358/60–63, 358/59, 55, 231–233; H04N 9/31, 5/74; 359/36, 37, 38, 40, 41, 49, 51, 52, 63, 64, 70, 634, 636, 237, 246, 247; 353/31, 30, 34, 37, 46, 50, 51

[56] References Cited

U.S. PATENT DOCUMENTS

| | | | |
|---|---|---|---|
| 4,197,559 | 4/1980 | Gramling | 358/58 |
| 4,435,047 | 3/1984 | Fergason | 350/334 |
| 4,582,396 | 4/1986 | Bos et al. | 358/61 |
| 4,668,077 | 5/1987 | Tanaka | 355/30 |
| 4,693,557 | 9/1987 | Fergason | 350/331 R |
| 4,913,528 | 4/1990 | Hasegawa | 350/286 |
| 4,936,658 | 6/1990 | Tanaka et al. | 350/337 |
| 5,022,750 | 6/1991 | Flasck | 353/31 |
| 5,024,524 | 6/1991 | Flasck | 353/31 |
| 5,040,877 | 8/1991 | Blinc et al. | 359/63 |
| 5,054,917 | 10/1991 | Pepin et al. | 356/152 |
| 5,083,857 | 1/1992 | Hornbeck | 359/291 |
| 5,097,323 | 3/1992 | Sato et al. | 358/60 |
| 5,098,183 | 3/1992 | Sonehara | 353/31 |
| 5,099,353 | 3/1992 | Hornbeck | 359/291 |
| 5,105,265 | 4/1992 | Sato et al. | 358/60 |
| 5,108,172 | 4/1992 | Flasck | 353/31 |
| 5,111,315 | 5/1992 | Ledebuhr | 359/64 |
| 5,115,305 | 5/1992 | Baur et al. | 358/60 |
| 5,136,426 | 8/1992 | Linden et al. | 359/589 |
| 5,140,427 | 8/1992 | Nakane et al. | 358/231 |
| 5,157,548 | 10/1992 | Monnier et al. | 359/630 |
| 5,164,821 | 11/1992 | Tanaka et al. | 358/61 |
| 5,170,194 | 12/1992 | Kurematsu et al. | 353/52 |
| 5,172,221 | 12/1992 | Ko | 358/61 |
| 5,172,222 | 12/1992 | Plantier et al. | 358/61 |
| 5,172,254 | 12/1992 | Atarashi et al. | 359/41 |
| 5,181,054 | 1/1993 | Nicolas et al. | 353/20 |
| 5,196,952 | 3/1993 | Hirai et al. | 359/51 |

FOREIGN PATENT DOCUMENTS

| | | | |
|---|---|---|---|
| 0362776A3 | 4/1990 | European Pat. Off. | |
| 0492721A2 | 7/1992 | European Pat. Off. | H04N 9/31 |
| 0312781 | 12/1988 | Japan | H04N 5/74 |
| 0236696 | 10/1991 | Japan | H04N 9/31 |
| WO 90/05429 | 5/1990 | WIPO | H04N 9/31 |

OTHER PUBLICATIONS

Glenn, "Solid State Driven Deformable Television Light Modulator," SID 87 Digest, pp. 72–74 (1987).
Patent Abstract of Japan, vol. 15, No. 304 (E-1096) Aug. 1991 (abstract of JP 03,108,892 NEC).
Patent Abstracts of Japan, vol. 15, No. 367 (E-1112), Sep. 1991 (abstract of JP 3,145,294, NEC Corp.).

*Primary Examiner*—James J. Groody
*Assistant Examiner*—Michael H. Lee
*Attorney, Agent, or Firm*—Herbert G. Burkard; Yuan Chao

[57] ABSTRACT

A color projection display uses a dichroic cube for modulating the color of light reaching the imaging element of the display. This way, a colored image may be projected by frame sequential technique, but with the use of only a single imaging element.

16 Claims, 9 Drawing Sheets

FIG_1a

FIG_1b

FIG_2a

FIG_2b

FIG_3

FIG_4

FIG_5a

FIG_5b

*FIG_6a*

*FIG_6b*

FIG_7a

FIG_7b

FIG_7c

FIG_7

APPARATUS FOR PROJECTING COLORED IMAGES

TECHNICAL FIELD OF THE INVENTION

This invention relates to an apparatus for projecting a colored image onto a screen.

BACKGROUND OF THE INVENTION

In a projection display, light from a light source has an image imparted to it and is then projected onto a screen for viewing. The display may be a front projection one, in which the projection mechanism is positioned on the same side of the screen as the viewer, or a rear projection one, in which the projection mechanism is positioned on the side of the screen away from the viewer. To achieve a colored display, three colored light beams (red, green, and blue), each having a respective red, green and blue image may be combined and projected.

The red, green and blue light beams may be generated from separate red, green, and blue light sources. However, using a single white light source whose light is separated into red, green and blue beams is a preferred design, for technical and economic reasons. The separation (and subsequent recombination) may be effected by a series of dichroic mirrors, such as taught in Williams et al., WO 90/05429 (1990), and Tanaka et al., U.S. Pat. No. 5,164,821 (1992).

The use of mirrors is undesirable from the point of view of compactness. It has also been taught to use a dichroic cube or prism for separating the white light into the colored components or combining the colored components, or both, as dichroic cubes or prisms can be made relatively compact. Illustrative teachings include Masanori et al., EP 0,362,776 A3 (1990); Sato et al., U.S. Pat. No. 5,097,323 (1992); Sonehara, U.S. Pat. No. 5,098,183 (1992), Sato et al., U.S. Pat. No. 5,105,265 (1992); Baur et al., U.S. Pat. No. 5,115,305 (1992); Kurematsu et al., U.S. Pat. No. 5,170,194 (1992); and Plantier et al., U.S. Pat. No. 5,172,222(1992).

The prior art employs three separate imaging elements for imparting images to each of the red, green, and blue light components, as typified in the Masanori et al. published application and the Sonehara and Kurematsu et al. patents. These imaging elements often are liquid crystal cells, especially of the twisted nematic ("TN") type. Such a design suffers from a number of limitations. An imaging element is among the more expensive components of a projection display, especially in a high resolution video display, because of the large number of pixels which the imaging element must contain, along with means for addressing them. Thus, it is desirable to have a projection display which does not require separate imaging elements for the red, green, and blue light components. Also, where the imaging element is a TN cell, the requisite polarizer extracts a price in the form of the inevitable loss of 50% of the incident light, with a concomitant decrease in brightness. (While one can compensate for the decrease in brightness by using a more powerful light source, this undesirably increases power consumption and heat output.)

A color projection display of the present invention offers a number of improvements over the prior art, including the ability to operate with a single imaging element and the ability to operate in the absence of polarizers.

SUMMARY OF THE INVENTION

This invention provides an apparatus for projecting a colored image onto screen, comprising:

image cell means on which an image to be displayed may be formed, for imparting an image to be displayed to the light reaching the image cell means from the light source means;

color modulator means for modulating the color of the light reaching the image cell means from the light source means, the color modulator means being optically positioned between the image cell means and the light source means and comprising a dichroic cube for separating white light from the light source means into plural component colored light beams and light valve means for controlling which of the plural component light beams exits the color modulator means and reaches the image cell means;

controller means for controlling the image formed on the image cell means and the color of the light exiting the color means, the controller means synchronizing the formation of images on the image cell means and the modulation of light color by the color modulator means such that the color of the light reaching the image cell means at a particular time corresponds to the color of the image formed on the image cell means at that particular time; and projection lens for projecting imaged light from the image cell means onto a screen.

In a first preferred embodiment, the light valve means comprises reflector means associated with each colored light beam, each reflector means being independently controllably reflective or non-reflective, to affect whether each respective component colored light beam is reflected or not by the reflector means and forms part of the exiting light beam, thereby determining the color of the light exiting the dichroic cube means.

In an aspect of the first preferred embodiment, the image cell means is divided into a plurality of segments on each of which a portion of an image may be independently formed and each reflector means is divided into a plurality of segments, each of which may be independently controlled to be reflective or non-reflective, and is associated with a segment of the image cell means; the controller means synchronizing the reflectivity of each segment of the reflector means to correspond to the presence or not of image information on the associated segment of the image cell means and the color of that image.

In a second preferred embodiment, the color modulating means comprises (a) a first dichroic cube means for separating white light from the light source means into plural component colored light beams; (b) a second dichroic cube means which is optically positioned to receive the plural component colored light beams from the first dichroic cube means and is capable of recombining the plural component colored light beams into an exiting light beam; and (c) light valve means associated with each of the plural component colored light beams and optically positioned between the first and the second dichroic cube means, each light valve means being independently controllably transmissive or not, for affecting whether each respective component colored light beam reaches or does not reach the second dichroic cube means and forms part of the exiting light beam, thereby determining the color of the light exiting the second dichroic cube means and the color modulating means.

BRIEF DESCRIPTION OF THE DRAWING(S)

FIG. 8 shows a workstation monitor made from an apparatus according to this invention.

DESCRIPTION OF THE PREFERRED EMBODIMENTS

The following detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

In general terms, this invention relates to frame-sequential projectors. A color modulator means modulates the color of light from a white light source. The color-modulated light is directed at an imaging element which imparts to it an image corresponding to the particular color of light reaching it. The colored images in turn are projected sequentially onto a screen, to create a colored image. Because at any moment only one of the color components is being imaged, advantageously only a single imaging element is required, instead of one per colored light component, as taught in the prior art. The design and operation of projectors according to this invention may be further understood by reference to the figures and the accompanying description hereinbelow, beginning with the dichroic cube component.

In a preferred embodiment, the color modulator means employs one or more dichroic cubes. Dichroic cubes, also known as color separating cubes, are known in the art for separating light into its component colors and then recombining them. Their general construction and mode of operation are described in Sonehara, U.S. Pat. No. 5,098,183 (1992); Kurematsu et al., U.S. Pat. No. 5,170,194 (1992); and Plantier et al., U.S. Pat. No. 5,172,222 (1992); the disclosures of which are incorporated by reference.

Figure 1A:
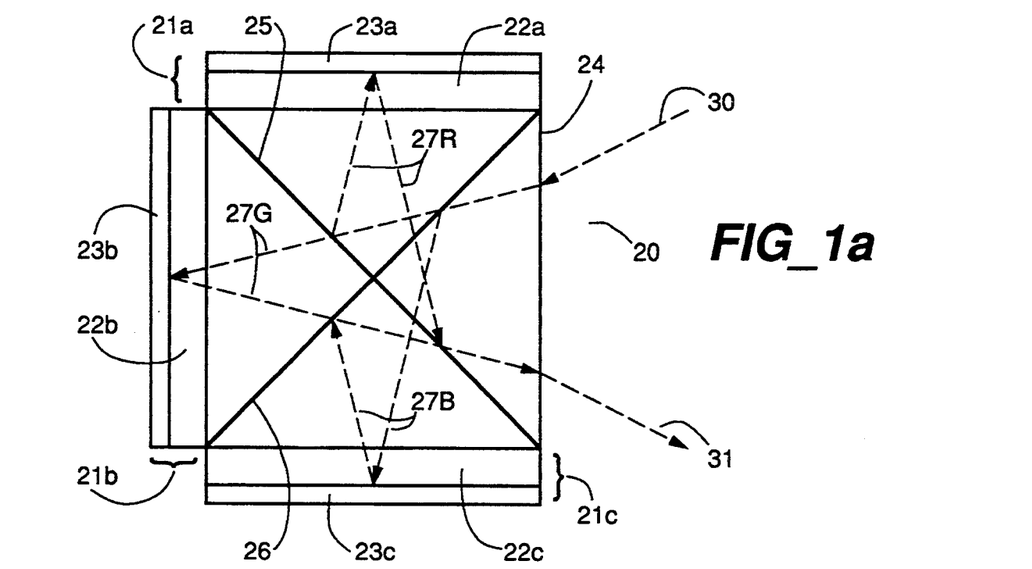
FIGS. 1a-1b show a dichroic cube light separator-recombiner having controllable reflector elements, suitable for use as a color modulating means.
Figure 1B:
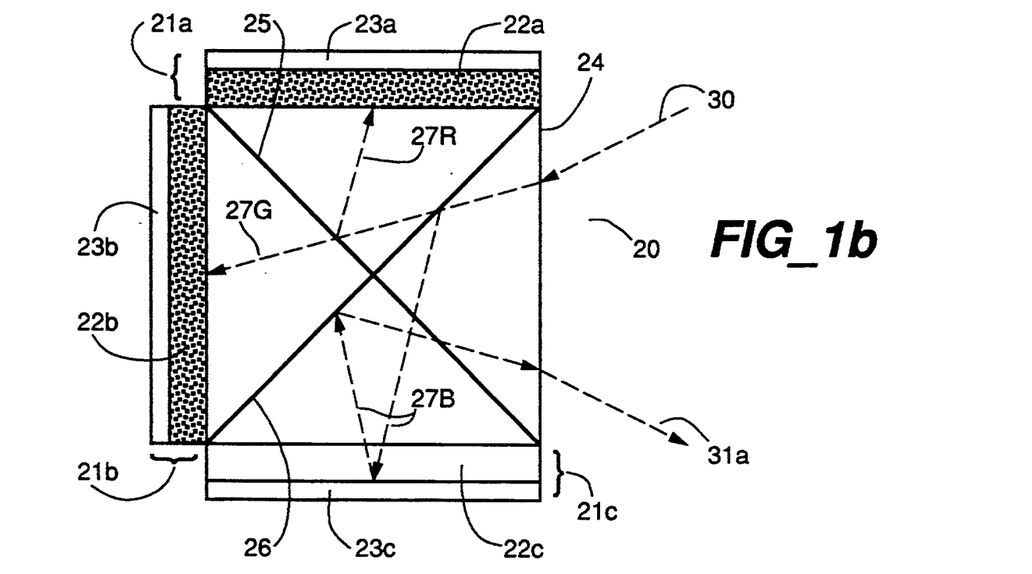

A dichroic cube color separator-recombiner set-up adapted for use in this invention is depicted schematically in FIG. 1a-1b. FIG. 1a shows a dichroic cube 20 having dichroic surfaces 25 and 26, made for example with multilayer dielectric stacks. Dichroic cube has three reflector means 21a-21c, each of which has a respective reflective surface 23a-23c positioned behind a respective light valve 22a-22c. Light valves 22a-22c independently may be switched between a substantially transparent state and a substantially non-transparent state, thereby permitting or preventing light from reaching reflective surfaces 23a-23c, so that each reflector means controllably may be made reflective or non-reflective. The switching of light valves 22a-22c is controlled by controller means 57, which may be for example a computer. In FIG. 1a, all three reflectors 21a-21c are shown with light valves 22a-22c in the transparent state.

When input white light beam 30 strikes prism surface 24, it is refracted but no substantial color separation occurs. When it next strikes dichroic surface 26, red and green light components 27R and 27G, respectively, are transmitted but blue light component 27B is reflected, in the direction of reflective surface 23c. Because light valve 22c is in its transparent state, blue light component 27B reaches reflective surface 23c, is reflected thereby, back towards dichroic surface 26. In turn, dichroic surface 26 reflects blue light component 27B towards dichroic surfaces 25 and thence out of dichroic cube 20, where it forms part of output light beam 31. Red and green components 27R and 27G, having passed through dichroic surface 26, strike dichroic surface 25, which transmits green or blue light but reflects red light. As a result, red light component 27R is reflected towards reflective surface 23a, passing through light valve 22a and is reflected by reflective surface 23a back towards dichroic surface 25 and thence out of dichroic cube 20, where it forms part of output light beam 31. Green light component 27G, not having been reflected by either dichroic surface 25 or 26, strikes reflective surface 23b after passing through light valve 22b, is reflected thereby, and exits dichroic cube 20 as part of output light beam 31. Because the three color components of original input light beam 30 have been recombined, output light beam 31 is white in this instance.

FIG. 1b shows the same device, except that now light valves 23a and 23b have been switched to their non-transparent states, while light valve 23c remains in its transparent state. Consequently, red and green components 27R and 27G do not reach and are not reflected by reflective surfaces 23a and 23b. Only blue light component 27B is reflected and forms part of output light beam 31a, which as a result is blue. By making either light valve 22a or 22b as the only one in the transparent state, one may obtain instead an output light beam 31a which is red or green, respectively.

Light valves 23a-23c are preferably liquid crystal light valves, which are advantageous because of their ease of switching from one visual state to another and their lower power consumption. Specific suitable liquid crystal light valves include those made with encapsulated liquid crystal material, thermally addressed smectic liquid crystal material, or dynamic scattering nematic liquid crystal material. Especially preferred are encapsulated liquid crystal light valves. The reflective surfaces may be simple mirrored surfaces made, e.g., from aluminum or silver or alloys thereof, or multilayer dielectric stack coatings.

For purposes of clarity, the differently colored light components have been described here in terms of the three primary colors red, green, and blue. However, other combinations may be used, especially the combination of the three complementary colors cyan, yellow, and magenta.

Figure 2A:
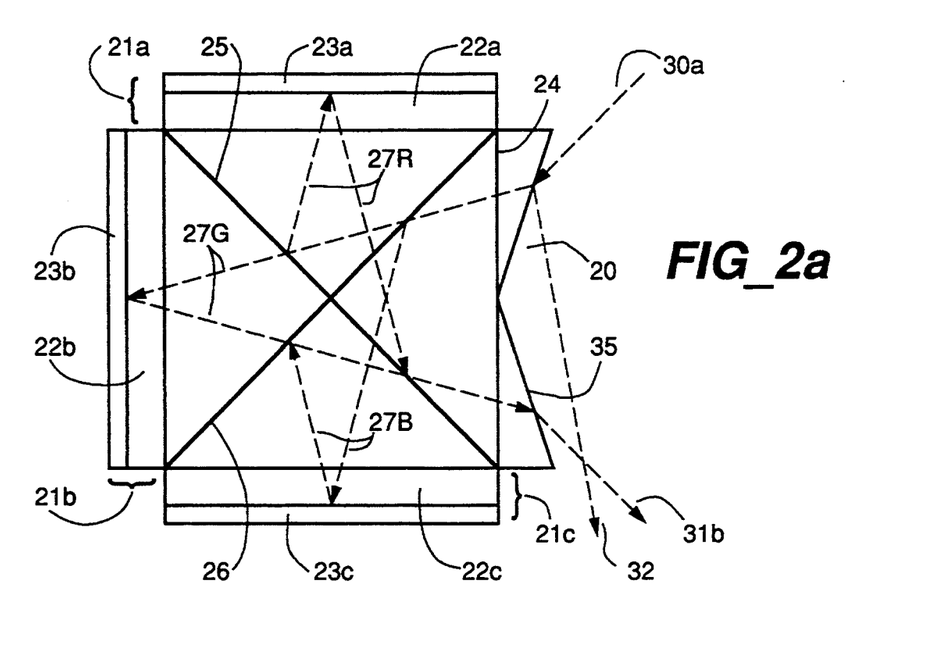
FIGS. 2a-2b show alternative dichroic cube configurations.

FIG. 2a shows a preferred embodiment in which prism 35 is positioned in front of dichroic cube 20 (numerals identical to those to those used in FIG. 2a–b referring to like elements). Prism 35 permits greater divergence between the input and output light beams 30a and 31b, respectively. As a result, the possibility of stray light beams (e.g., ray 32) accompanying output light beam 31b is reduced.

Figure 2B:
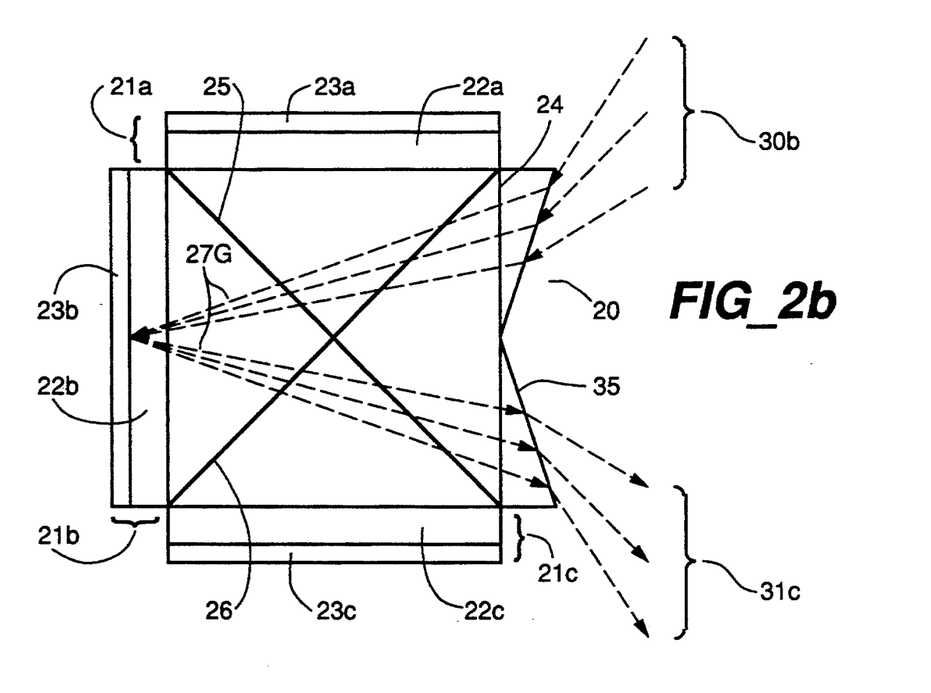

FIG. 2b shows another preferred embodiment. If the input beam 30b is brought to a focus or disk of least diameter at reflector means 21a–21c, light loss through vignetting is minimized, and the quality of output light beam 31c is improved. (For clarity, this embodiment is illustrated only by reference to the green light component 27G.)

Figure 3:
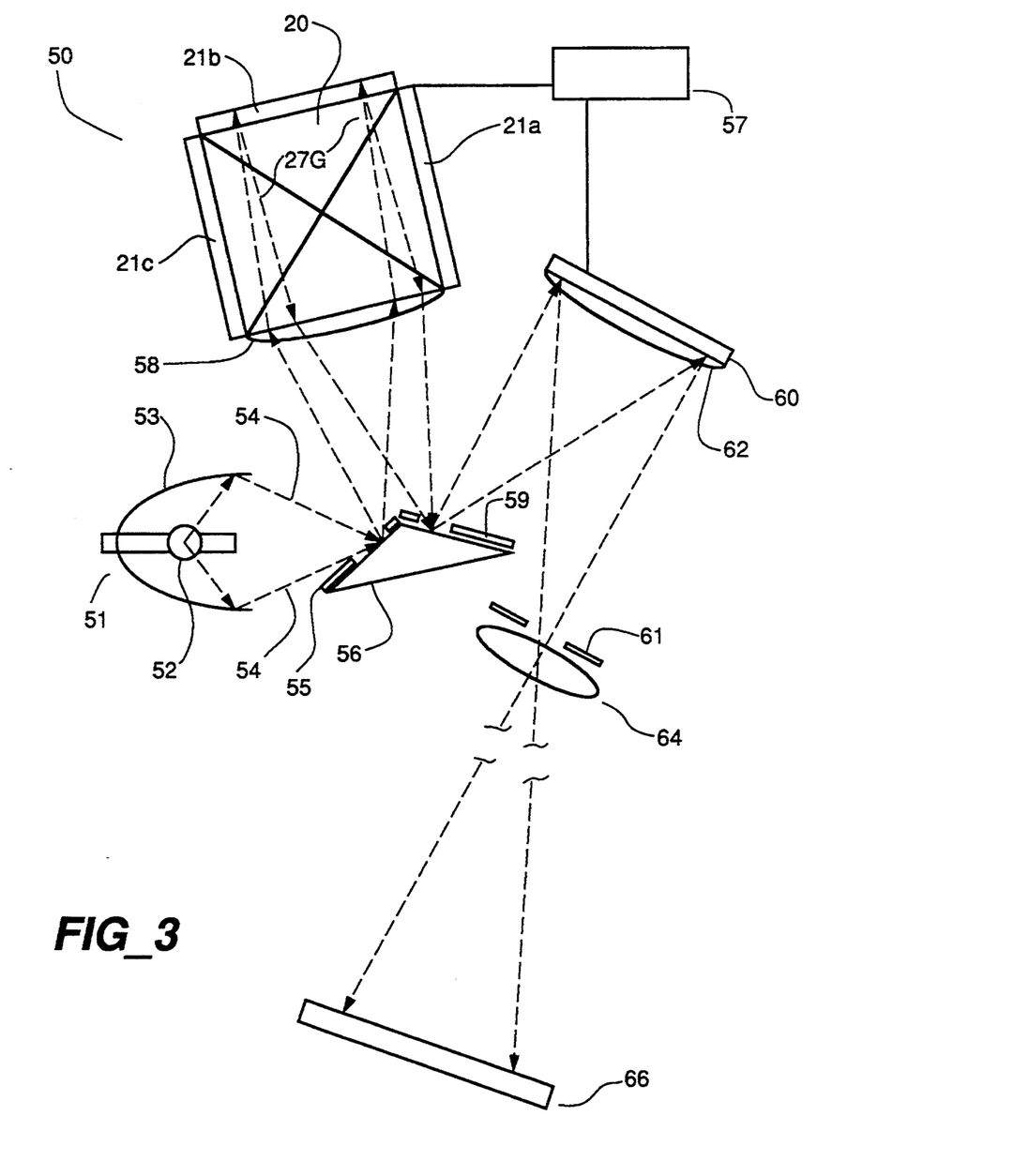
FIGS. 3-4 show projection displays according to this invention.

FIG. 3 shows a projection display 50 according this invention in which a reflective imaging cell is employed. Light source means 51 comprises arc lamp 52 and elliptical mirror 53. Light 54 generated by arc lamp 52 is focussed by elliptical mirror 52 onto a first face of prism 56, after passing through a source-size limiting iris 55. Prism 56 directs light towards a color modulator means in the form of dichroic cube 20. At the instant time $t_1$, reflector means 21a and 21c are in their non-reflective state, so that only green light component 27G is reflected, by respective reflector means 21b. As a result, the light output by dichroic cube 20 is green. The output light is focussed onto another face of prism 56 by lens 58 and then reflected towards reflective image cell 60, where an image is imparted thereto. Maximum contrast is obtained when the image of the aperture of iris 55 equals the size and position of the aperture of iris 59. Lens 62 takes divergent light from prism 56 and renders it parallel to be reflected off image cell 60, and then converges it to a focus at iris 61. The output light is preferably focussed on image contrast enhancing iris 61 of reflective image cell 60. The imaged green light reflected from image cell 60 is then focussed by lens 64 onto screen 66 for viewing. Projector 50 may be either a front projection or a rear projection one.

Controller means 57 controls both the switching of reflector means 21a–c and the image presented on reflective image cell 60, synchronizing the color output from dichroic cube 20 to correspond to the color of the image formed on image cell 60 at that time. At a subsequent time $t_2$, controller means 57 may direct dichroic cube 20 to have reflector means 21a to be the only one in the reflective state, so that light output from dichroic cube 20 is red. At the same time, the image formed on image cell 60 is synchronized by controller means 57 to be the red image, so that a correct red image is projected. At yet another subsequent time $t_3$, the output light and the image on the image cell 60 are synchronized to be the blue light and the blue image, respectively, so that the correct blue image is projected. This switching is done at a high rate (at least 60 Hz, preferably at least than 150 Hz) so that the human eye is not able to resolve the alternating images as distinct green, red, and blue images, but perceives only a composite colored image. Thus by sequentially projecting the red, green, and blue components of each frame of a video image in rapid succession, a colored video image may be displayed.

Figure 4:
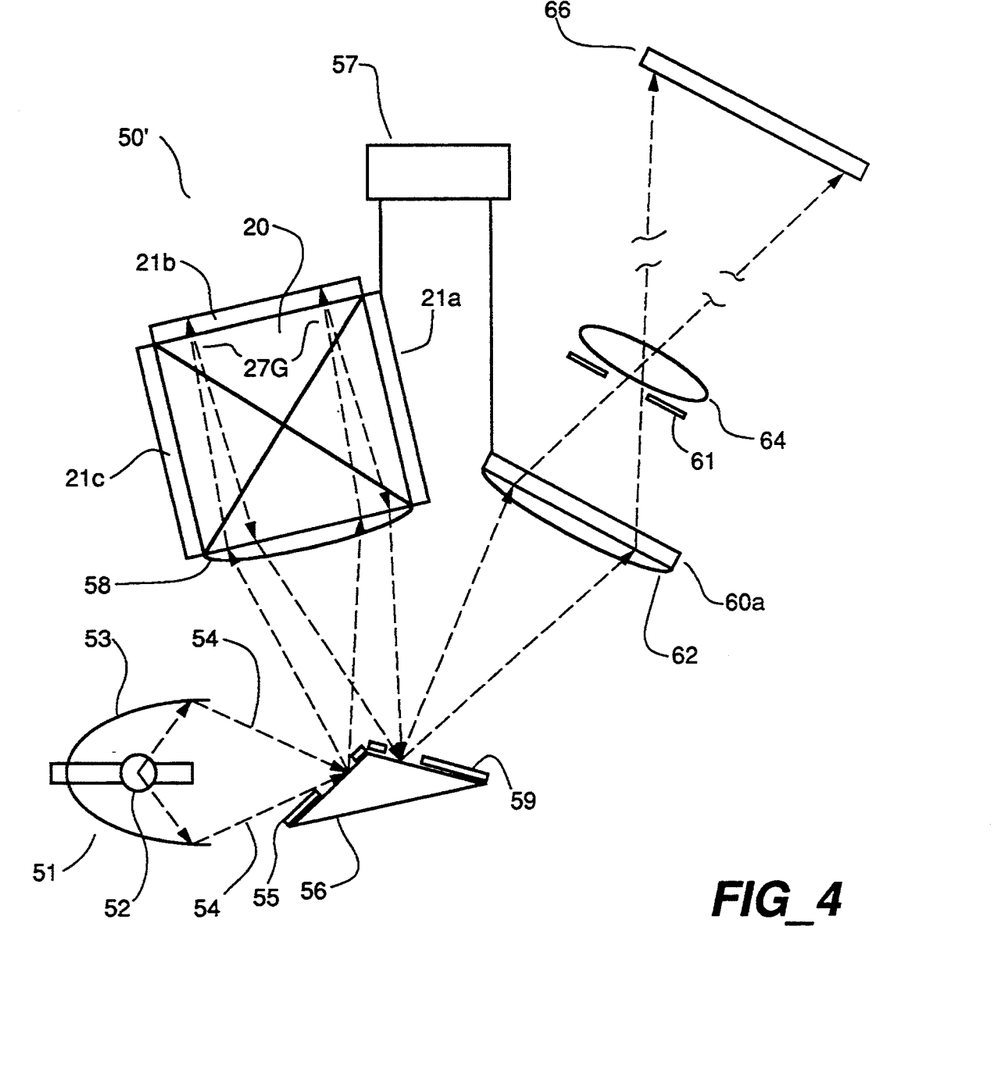

FIG. 4 shows a projection display 50' according to this invention having a transmissive imaging cell, like numerals to elements in FIG. 3 identifying like elements. The general manner of operation is as discussed hereinabove, except that imaging cell 60a is transmissive, and not reflective like imaging cell 60 of FIG. 3.

Those skilled in the art will appreciate that certain conventional elements shown in the figures may be replaced with alternative elements of equivalent functionality, mutatis mutandis. For example, elliptical mirror 53 may be replaced by a parabolic mirror and collimating lens and prism 56 may be replaced by one or more mirrors.

Suitable imaging cells 60 or 60a includes TN or encapsulated liquid crystal cells, preferably addressed by a MOS or thin film transistor active matrix, deformable mirror devices such as disclosed in Hornbeck, U.S. Pat. No. 5,083,857 (1992) and 5,099,353 (1992), and deformable elastomer devices such as disclosed in Glenn, SID 87 Digest, pp. 72–74 (1987), the disclosures of the foregoing publications being incorporated by reference.

In frame sequential projection, each colored image component (red, green, or blue) may be projected in its entirety all at once (the so-called "frame store" or "frame series" approach), as discussed above. However, it may be preferable, to facilitate image data processing and/or transmission, to project each colored image component a line (or a few lines) at a time (the so-called "line store" or "line series" approach). In such an instance, reflector means 21a–c may be segmented, with the reflectivity of each segment being independently controllable and synchronized with the imaging of each line (or group of lines) in the imaging cell.

Figure 5A:
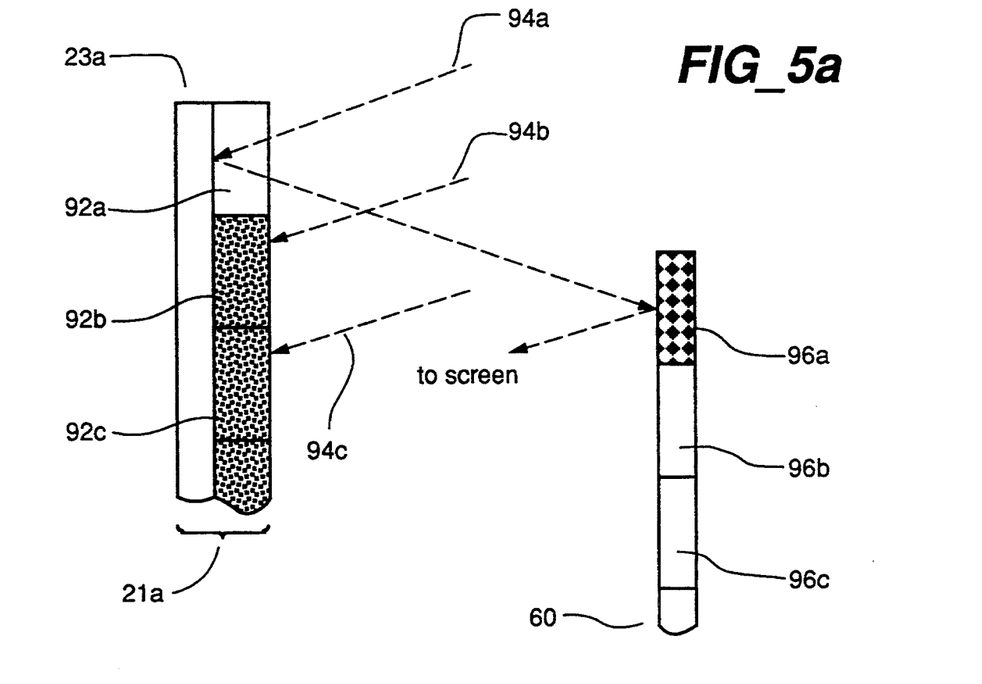
FIGS. 5a-5b show how the reflectivity of a segmented controllable reflector element may be synchronized with the addressing of corresponding segments of an image cell.
Figure 5B:
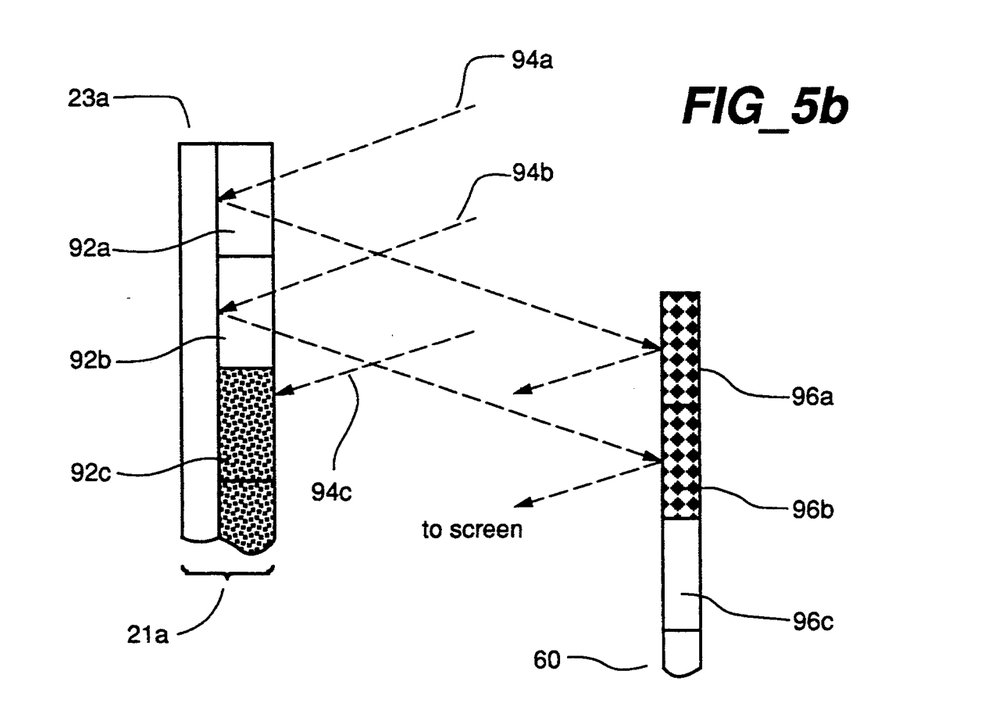

FIG. 5a–5b show how the reflectivity of segments of a reflector means may be synchronized with the addressing of corresponding segments of an imaging cell. A reflector means 21a has a reflective surface 23a as described above. However, the light valve positioned in front of reflective surface comprises a plurality of individually switchable light valve segments such as those identified by numerals 92a–92c. In FIG. 5a light valve segment 92a is in its transmissive state, so that incident light beam 94a is transmitted therethrough to be reflected by reflective surface 23a towards imaging cell 60. (For the sake of clarity, other elements such as prisms, lenses, and the like have been omitted.) Imaging cell 60 is likewise divided into a plurality of corresponding individually addressable image cell segments such as those identified by the numerals 96a–96c, each corresponding to a line or group of lines of the overall image. At the time $t_a$ of FIG. 5a, image cell segment 96a has been addressed and contains image information for the current color frame. Light beam 94a reaches image segment 96a, has image information imparted thereto, and is reflected for projection onto a screen. Image cell segments 96b and 96c have not yet been addressed and therefore contain image information for the previous color frame. But corresponding light valve segments 92b and 92c of reflector means 21a are in their non-transmissive states, so that light beams 94b and 94c do not reach image cell segments 96b and 96c.

FIG. 5b shows the same set-up at a subsequent time $t_b$, at which time image cell segment 96b also has been addressed and contains image information. Light valve segment 92b has synchronously been switched to its transmissive state, so that light beam 94b now reaches image cell segment 96b for imaging and projection to a screen. (Because of the nature of the addressing process, image cell segment 96a retains its image information even though it is not being actively addressed at the moment. Therefore, light valve segment 92a is also maintained in its transmissive state.)

A preferred light valve for controlling the reflectivity of the reflective means is made from encapsulated liquid crystal material. In an encapsulated liquid crystal material, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystal composition appears to form a continuous phase. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal composition is nematic or operationally nematic. More preferably, it also has a positive dielectric anisotropy.

Individual liquid crystal molecules typically have elongated shapes, with a tendency to align themselves with their long molecular axes parallel to each other. This alignment causes a liquid crystal composition to be anisotropic, meaning that its measured physical, optical, and other properties are dependent on the direction of measurement (parallel or perpendicular to the direction of alignment). The alignment direction may be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

An anisotropic property is the dielectric constant ($\epsilon$), having two principal values, one perpendicular ($\epsilon_\perp$) to the long molecular axis and one parallel ($\epsilon_\parallel$) to the long molecular axis. An average dielectric constant ($\epsilon_{avg}$) may be calculated, which is conventionally a weighted average (See, e.g., Weber et al., Liq. Crystals, Vol. 5, No. 5, pp. 1381-1388 (1989)):

$$\epsilon_{avg} = \frac{2\epsilon_\perp + \epsilon_\parallel}{3}$$

Preferably, the liquid crystal composition has an $\epsilon_{avg}$ greater than 5 (at 1 kHz and 25° C.). It is especially preferred that $\epsilon_{avg}$ is between about 5 and about 10, most preferably between about 6 and about 10. Dielectric constants and dielectric anisotropy may be measured by the method of Finkenzeller et al., "Physical Properties of Liquid Crystals: III. Dielectric Permittivities," The Merck Group Liquid Crystal Newsletter, No. 4 (Mar. 1989).

The liquid crystal composition also preferably has a low cyano content, i.e., less than 1.8 meq/g cyano groups (more preferably less than 0.5 meq/g). It is especially preferred that the liquid crystal composition be substantially free of cyano groups or consists essentially of compounds free of cyano groups. Preferred liquid crystal compositions for the practice of this invention are disclosed in Kamath et al., U.S. application Ser. No. 07/806,573, filed Dec. 12, 1991, the disclosure of which is incorporated herein by reference.

Commonly the liquid crystal composition generally does not consist of a single discrete compound, but is a mixture of different liquid crystal compounds. It is preferred that the liquid crystal composition comprises fluorinated and/or chlorinated liquid crystal compounds, such that the overall composition has a fluorine and/or chlorine content greater than 2.0 meq/g, preferably between 2.0 and 10.0 meq/g. It is especially preferred that the halogen is fluorine.

The liquid crystal composition also preferably has a large optical anisotropy $\Delta n$ (the difference between its ordinary and extraordinary refractive indices), also called the birefringence. A large $\Delta n$ leads to more scattering in the field-off state, resulting in a display with higher contrast. Since the ordinary refractive index of the liquid crystal composition generally is substantially matched to the refractive index of the containment medium, a larger $\Delta n$ also means a larger difference between the latter and the extraordinary refractive index of the liquid crystal material. This latter difference affects the field-off scattering, with larger amounts of scattering being associated with larger differences. Preferably, $\Delta n$ is greater than 0.15, more preferably between 0.20 and 0.30. Optical anisotropy may be measured by the method of Finkenzeller et al., "Physical Properties of Liquid Crystals: IV. Optical Anisotropy," The Merck Group Liquid Crystal Newsletter, No. 5 (October 1989).

The containment medium is preferably a polymeric material. Suitable containment media include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred containment medium.

Encapsulated liquid crystal material may be made by deposition from an emulsion containing both the containment medium and the liquid crystal composition, in the presence of a carrier medium. The emulsion may be made with apparatus such as propeller blade mixers, colloid mixers, and the like. The additive means may be added to either the containment medium or the liquid crystal composition, or both, and either before or after the emulsion is formed. Preferred emulsion techniques are taught in Fergason, U.S. Pat. Nos. 4,435,047 (1984), 4,606,611 (1986), 4,616,903 (1986), and 4,707,080 (1987); Pearlman et al., U.S. Pat. Nos. 4,992,291 (1991); and Wartenberg et al., U.S. Pat. No. 5,202,063 (1993); the disclosures of which are incorporated herein by reference.

Encapsulated liquid crystal material may also be made by phase separation techniques. In one embodiment, a solvent is evaporated from a homogeneous solution containing both containment medium and the liquid crystal composition. In another embodiment, an initially homogeneous mixture containing both containment medium and liquid crystal composition is heated to an elevated temperature, then cooled to phase-separate out liquid crystal volumes contained in the containment medium. Further, it may be formed by an in-situ polymerization process, in which a precursor of containment medium (e.g., a polymerizable monomer) is polymerized and simultaneously encapsulates a liquid crystal composition as it phase separates. The liquid crystal composition need not be entirely surrounded by the polymer, and may exist as part of a system with co-continuous phases. Preferred phase separation techniques are taught in Wu et al., U.S. Pat. Nos. 4,671,618 (1987); West et al., U.S. Pat. No. 4,673,255 (1987) and 4,685,771 (1987); Doane et al., U.S. Pat. No. 4,688,900 (1987); and Dainippon Ink and Chemicals, EP 0,313,053 (1989); the disclosures of which are incorporated herein by reference.

Typically, an encapsulated liquid crystal material is substantially non-transparent in the absence of an electric field (the "field-off" state) and substantially transparent in the presence of a sufficient electric field (the "field-on" state). The electric field induces a change in the alignment of the liquid crystal molecules in the liquid crystal composition, in turn causing the encapsulated liquid crystal structure to switch from a highly light-scattering (and/or absorbent) state to a highly non-scattering (and/or non-absorbent) and substantially transparent state. Generally, it is preferred that the liquid crystal composition have a positive dielectric anisotropy and that the ordinary refractive index of the liquid crystal composition be matched with the refractive index of the containment medium, while the extraordinary refractive index is substantially mismatched therewith. There is further scattering which may occur due to the different liquid crystal alignments in neighboring droplets. If this is the dominant mode of scattering, the requirement for refractive index matching may be relaxed. The principles of operation of encapsulated liquid crystal structures are further described in the aforementioned references, particularly the Fergason patents. In those portions of the encapsulated liquid crystal structure to which a sufficient electric field is applied, the transition from a non-transparent state to a transparent state occurs, while adjacent areas to which no electric field has been applied remain non-transparent.

Figure 6A:
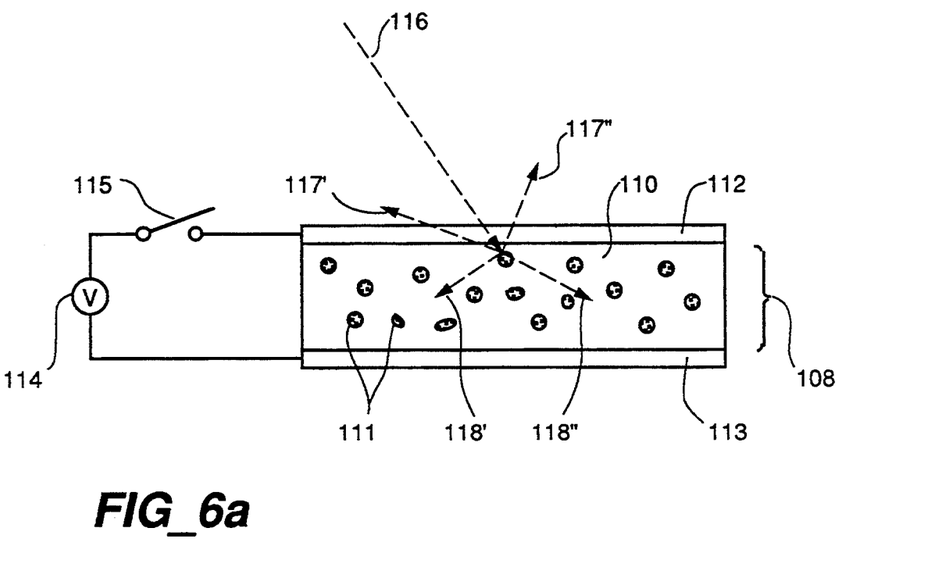
FIGS. 6a-6b illustrate the manner of operation of encapsulated liquid crystal material as a light valve.
Figure 6B:
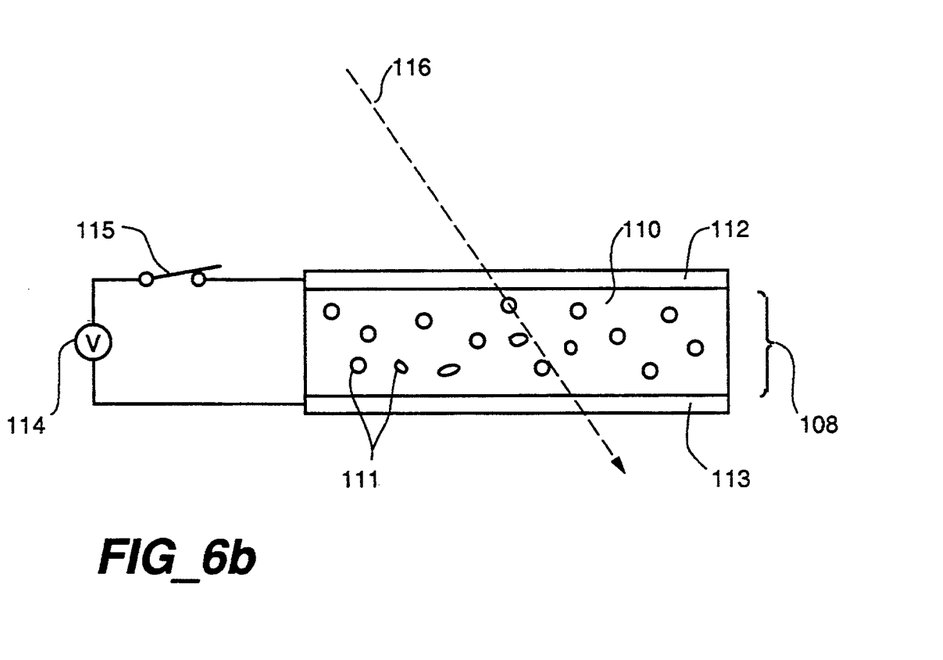

The principle of operation of an encapsulated liquid crystal material as a light valve is illustrated in FIGS. 6a–6b (like numerals referring to like elements). Encapsulated liquid crystal material 108 comprises a containment medium 110 having distributed therein plural volumes of liquid crystal composition 111 and is positioned between top and bottom electrodes 112 and 113, respectively, made for example of indium tin oxide ("ITO") or a thin metal coating. The plural volumes have been depicted in a generally spherical shape as a matter of convenience, but they may be irregularly shaped or even in the shape of substantially separated volumes interconnected by narrow passages. Electrodes 112 and 113 (together with encapsulated crystal material 108) may be supported by respective top and bottom support sheets, not shown. The support sheets may be made of a transparent dielectric such as glass or polymer (preferably poly(ethylene terephthalate) ("PET")). A voltage source 114 is connected to electrodes 112 and 113, but with switch 115 in the open position (FIG. 6a), no voltage is applied across encapsulated liquid crystal material 112. Incident light ray 116 is scattered, backward (rays 117' and 117") and/or forward (rays 118' and 118"). When switch 115 is closed (FIG. 6b), a voltage is applied across encapsulated liquid crystal material 108, causing molecules in liquid crystal composition 111 to align their long molecular axes with the field of the applied voltage. Owing to the match between the refractive index of containment medium 110 and the ordinary refractive index of liquid crystal composition 111, incident light ray 116 now is not scattered, but is transmitted through encapsulated liquid crystal material 108. While the forwardly scattered light rays 118' and 118" may reach reflective surfaces 23a–c of reflector means 21a–21c, they are not specularly reflected, and so only a small portion is parallel to the exiting light beam (e.g., ray 31 of FIG. 1a) and able to enter the projection lens entrance pupil and pass onto the screen.

For "frame-sequential" displays, fast switching speeds (e.g. less than 5 msec) are desired in order to obtain good color purity. Encapsulated liquid crystal materials are well suited for use as light valves in frame sequential displays because of their fast switching speeds, on the order of 20 msec or less. The preparation of preferred encapsulated liquid crystal materials having special additives to reduce their switching speeds is disclosed in copending, commonly assigned application of Wartenberg et al., Ser. No. 08/028,497, filed Mar. 9, 1993, the disclosure of which is incorporated by reference.

Figure 7:
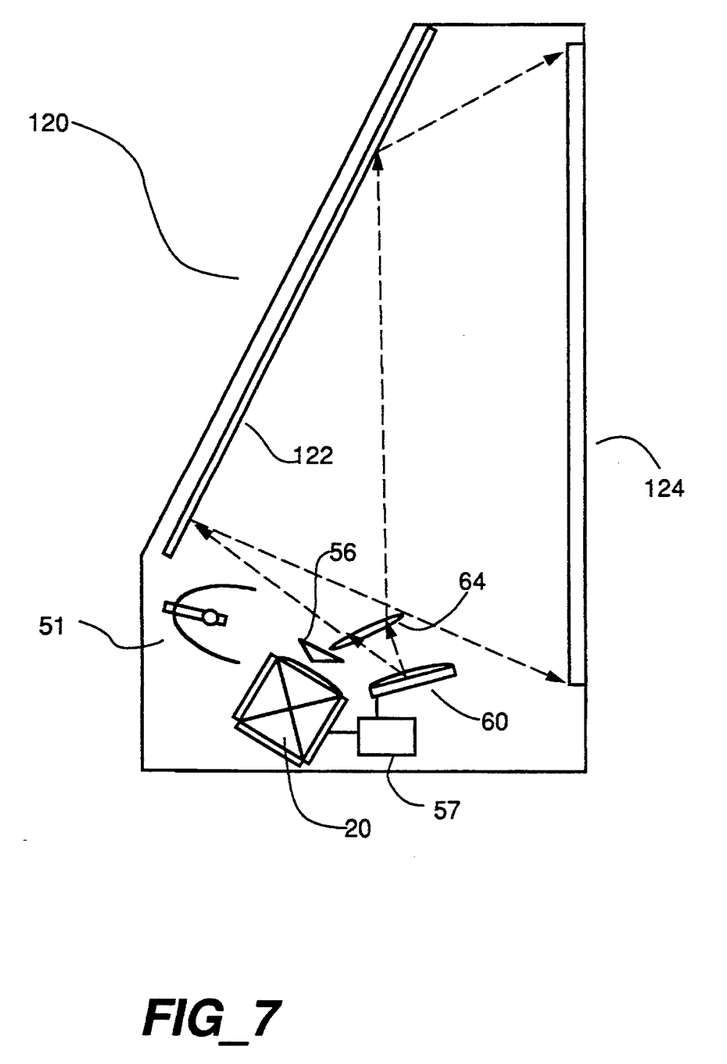
FIG. 7a-7c illustrate further color modulators suitable for use in this invention.
Figure 7A:
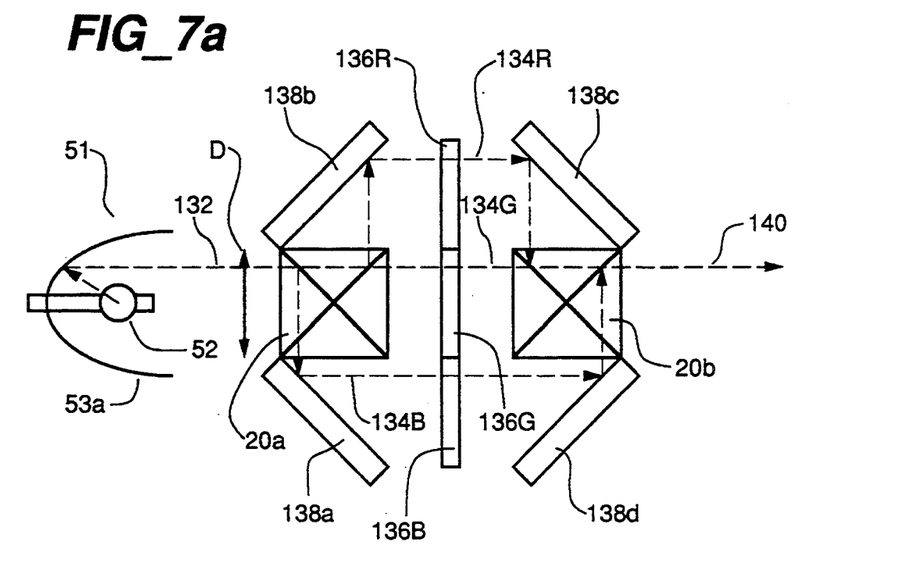
Figure 7B:
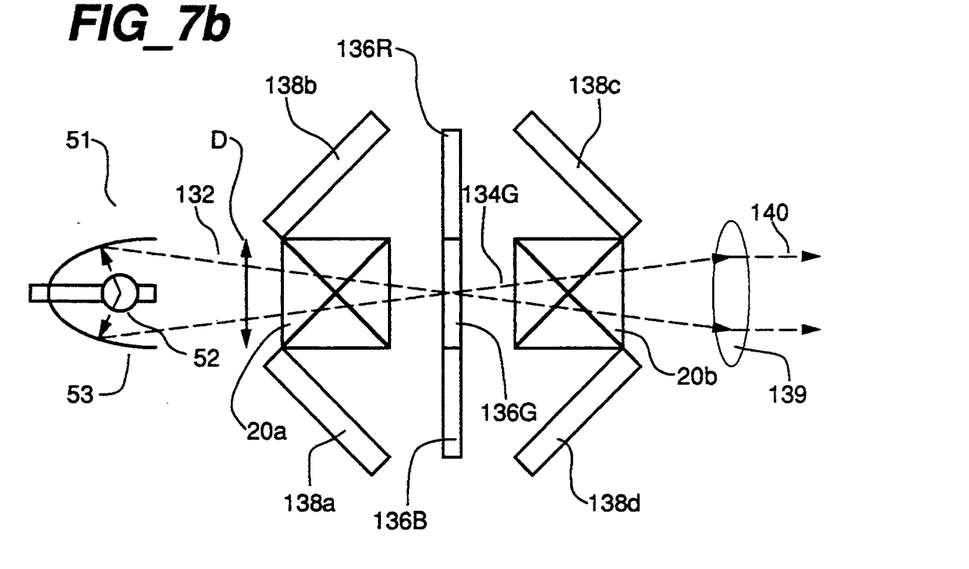
Figure 7C:
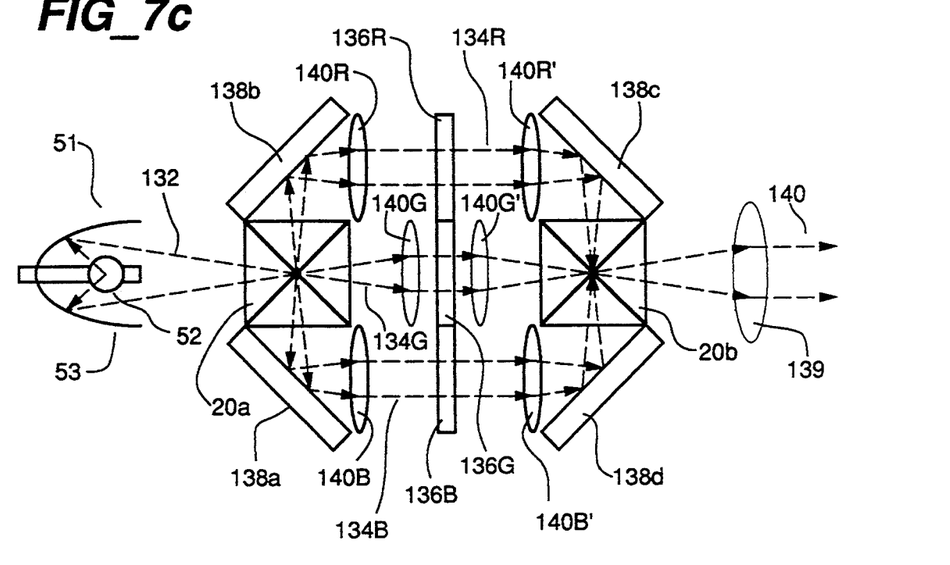

FIG. 7a–7c show further preferred embodiments of the color modulator. Because of the cost of large dichroic cubes, it may be more cost-effective to use a combination of two smaller dichroic cubes. The embodiment of FIG. 7a is particularly adapted for use with line addressed image cells. Light source 51 comprises arc lamp 52 and parabolic mirror 53a, which directs parallel rays of white light 132 (for simplicity, only one ray is shown) towards first dichroic cube 20a. Dichroic cube 20a separates white light 132 into component red, green, and blue light beams 134R, 134G, and 134B. Light valves 136R, 136G, and 136B control the transmission of light beams 134R, 134G, and 134B, respectively. If all three light valves are in their transmissive state (such as shown in the figure), then all light rays enter second dichroic cube 20b, which recombines them into an exiting light beam 140. Reflectors 138b and 138c serve to redirect red beam 134B towards second dichroic cube 20b, while reflectors 138a and 138d serve the same function with respect to blue light beam 134B. In the arrangement shown, no reflectors are needed with respect to green light beam 134G. By switching, for example, light valves 136G and 136B to their non-transmissive states, then only red light beam 134B can enter second dichroic cube 20b and exiting light beam 140 is consequently red.

FIG. 7b shows a similar color modulator (with like numerals to elements in FIG. 7a denoting like elements), except that light source 51 has an elliptical mirror 53, such that light directed at first dichroic cube 20a is not parallel, but focussed on the light valves 136R, 136G, and 136B. Lens 139 restores the parallel relationship of the exiting light 140 for transmission to the image cell means. The advantage of this embodiment is that the optical aperture of dichroic cubes 20a and 20b (denoted by the dimension D in FIG. 7a and 7b) may be smaller in the embodiment of FIG. 7b, permitting the use of even smaller dichroic cubes in the construction of the device. This embodiment is particularly suited for use with frame addressed image cells.

FIG. 7c (like numerals to those in FIG. 7a–b denoting like elements) shows a further embodiment which retains the ability of the embodiment of FIG. 7b to use smaller dichroic cubes but is adapted for use with line-addressed imaging cells, like the embodiment of FIG. 7a. This can be achieved by inserting lens elements 140R—140R, 140G—140G, and 140B—140B, respectively before and after light valves 136R, 136G, and 136B, respectively. The lens elements serve to parallelize the light rays 134R, 134G, and 134B as they pass through respective light valves 136R, 136G, and 136B, thereby making this color modulator compatible with line-addressed imaging cells. The light valves are then imageable onto the image cell, bringing each color segment in focus (or nearly so) onto the screen.

A preferred application of the instant invention is shown in FIG. 8. FIG. 8 depicts a workstation color monitor 120 driven by a frame-sequential one-cell projection engine of the type shown in FIG. 3. Light source 51, color modulator 20, prism 56, imaging cell 60, and projection lens 64 are as described in FIG. 3. For the sake of clarity, the other elements have been omitted and the path of the light rays is shown only after being imaged by imaging cell 60. Instead of being directly projected onto screen 124, light is first directed towards mirror 122, from which it is reflected onto screen 124. This construction enables a much more compact design, compatible with the space requirements of workstation monitors.

What is claimed is:

1. An apparatus for projecting a colored image onto a screen, comprising:

light source means for generating white light;

image cell means on which an image to be displayed may be formed, which image cell means imparts an image to be displayed to light reaching the image cell means from the light source means;

color modulator means for modulating the color of the light reaching the image cell means from the light source means, the color modulator means being optically positioned between the image cell means and the light source means and comprising a dichroic cube for separating white light from the light source means into plural component colored light beams and light valve means for controlling which of the plural component light beams exits the color modulator means and reaches the image cell means;

controller means for controlling the image formed on the image cell means and the color of the light exiting the color modulator means, the controller means synchronizing the formation of images on the image cell means and the modulation of light color by the color modulator means such that the color of the light reaching the image cell means at a particular time corresponds to the color of the image formed on the image cell means at that particular time; and projection lens for projecting imaged light from the image cell means onto a screen;

wherein the light valve means comprises reflector means associated with each colored light beam, each reflector means being independently controllably reflective or non-reflective, to affect whether each respective component colored light beam is reflected or not by the reflector means and forms part of the exiting light beam, thereby determining the color of the light exiting the dichroic cube.

2. An apparatus according to claim 1, wherein the image cell means is a reflective image cell means.

3. An apparatus according to claim 1, wherein the image cell means is a transmissive image cell means.

4. An apparatus according to claim 1, further comprising prism means positioned in front of the dichroic cube for increasing the divergence between the light entering and exiting the dichroic cube means.

5. An apparatus according to claim 1, further comprising a focusing means for focusing light entering the dichroic cube to a disk of least diameter at the reflector means.

6. An apparatus according to claim 1, wherein the reflector means comprises encapsulated liquid crystal material and a reflective surface means positioned therebehind.

7. An apparatus according to claim 7, wherein the image cell means is a reflective image cell means.

8. An apparatus according to claim 6, wherein the image cell means is a transmissive image cell means.

9. An apparatus according to claim 1, wherein the image cell means is divided into a plurality of segments on each of which a portion of an image may be independently formed and each reflector means is divided into a plurality of segments, each of which may be independently controlled to be reflective or non-reflective, and is associated with a segment of the image cell means; the controller means synchronizing the reflectivity of each segment of the reflector means to correspond to the presence or not of image information on the associated segment of the image cell means and the color of that image.

10. An apparatus according to claim 9, wherein the image cell means is a reflective image cell means.

11. An apparatus according to claim 9, wherein the image cell means is a transmissive image cell means.

12. An apparatus according to claim 9, further comprising prism means positioned in front of the dichroic cube means for increasing the divergence between the light entering and exiting the dichroic cube.

13. An apparatus according to claim 9, further comprising a focussing means for focussing light entering the dichroic cube to a disk of least diameter at the reflector means.

14. An apparatus according to claim 9, wherein the reflector means comprises encapsulated liquid crystal material and a reflective surface means positioned therebehind.

15. An apparatus according to claim 14, wherein the image cell means is a reflective image cell means.

16. An apparatus according to claim 14, wherein the image cell means is a transmissive image cell means.

* * * * *

UNITED STATES PATENT AND TRADEMARK OFFICE
CERTIFICATE OF CORRECTION

PATENT NO. : 5,398,081
DATED : March 14, 1995
INVENTOR(S) : Philip Jones

It is certified that error appears in the above-indentified patent and that said Letters Patent is hereby corrected as shown below:

Column 10, line 66, delete "140R-140R,140G-140, and 140B-140B" and insert-- "140R-140R',140G-140G'and 140B-140B'--.

Signed and Sealed this

Twenty-sixth Day of September, 1995

Attest:

BRUCE LEHMAN

Attesting Officer     Commissioner of Patents and Trademarks